United States Patent
Očić

(10) Patent No.: US 6,446,830 B1
(45) Date of Patent: Sep. 10, 2002

(54) CONTAINER WITH HANDLE FOR STORING AND CONSUMING LIQUIDS

(76) Inventor: Milan Očić, Drugi vrbik 4, Zagreb (HR), HR-10000

( * ) Notice: Subject to any disclaimer, the term of this patent is extended or adjusted under 35 U.S.C. 154(b) by 0 days.

(21) Appl. No.: 09/857,706

(22) PCT Filed: Sep. 3, 1999

(86) PCT No.: PCT/HR99/00019
§ 371 (c)(1),
(2), (4) Date: Jun. 8, 2001

(87) PCT Pub. No.: WO00/34138
PCT Pub. Date: Jun. 15, 2000

(30) Foreign Application Priority Data

Dec. 10, 1998 (HR) .......................................... M980206A
Dec. 10, 1998 (HR) .......................................... M980207A
Jun. 23, 1999 (HR) .......................................... P990197A

(51) Int. Cl.⁷ .................................................... B65D 23/10
(52) U.S. Cl. ............................................ 220/771; 220/752
(58) Field of Search ............................... 220/752, 755, 220/756, 771; 215/384

(56) References Cited

U.S. PATENT DOCUMENTS

| | | | |
|---|---|---|---|
| 4,813,556 A | * 3/1989 | Lawrence | 220/771 |
| 4,969,571 A | * 11/1990 | Bartz | 220/771 |
| 4,984,707 A | * 1/1991 | Fierthler | 220/771 |
| 5,114,028 A | * 5/1992 | Ring | 220/771 |
| 5,226,574 A | * 7/1993 | Durinzi, Jr. | 220/771 |
| 5,320,231 A | 6/1994 | Iodice | 215/100 |
| 5,322,184 A | * 6/1994 | Bergner et al. | 220/771 |
| 5,366,101 A | * 11/1994 | Krall et al. | 220/771 |

FOREIGN PATENT DOCUMENTS

| | | |
|---|---|---|
| DE | 3818684 A1 | 12/1989 |
| DE | 4130320 A1 | 3/1993 |
| EP | 0609644 A1 | 8/1994 |
| GB | 1549861 | 8/1979 |

* cited by examiner

Primary Examiner—Joseph M. Moy
(74) Attorney, Agent, or Firm—Jacobson Holman, PLLC

(57) ABSTRACT

Container with handle for storing and consuming liquids is a double-purpose container that is used in the food and beverages industry as a reusable, returnable receptacle for storing and transporting liquid or semi-liquid products. It may also find application in the catering industry and the household where it may be used as a drinking vessel for alcoholic and non-alcoholic drinks. Container (1) is a barrel-shaped hollow body of uniform wall thickness with bottom on the lower side and an opening on the upper side. It is defined by the outer shell that is produced through rotation of the generatrix of Container (1) around the central Axis (O). The rotary symmetrical Section (4) of the outer shell features the Hollow (3) that forms Handle (2). Shown in FIG. 1.2 is the container design with centrally positioned handle and threads on the inner shell of the opening that is closed by a reusable screw cap. FIG. 2.1 shows the container design with handle placed in the lower section of the container and a ring on the outer rim of the opening that is closed by means of a disposable top that is turned over the ring at the outer edge of the opening and is opened by being lifted or torn. The diameter of the opening of Container (1) is several times larger than standard diameter of bottle openings and smaller than the largest diameter of the cylindrical part of Container (1). The useful volume of Container (1) ranges between 0.3 liter and 1.5 liter. The container may be made of polymeric materials, metals and their alloys, glass, ceramic or wood.

8 Claims, 9 Drawing Sheets

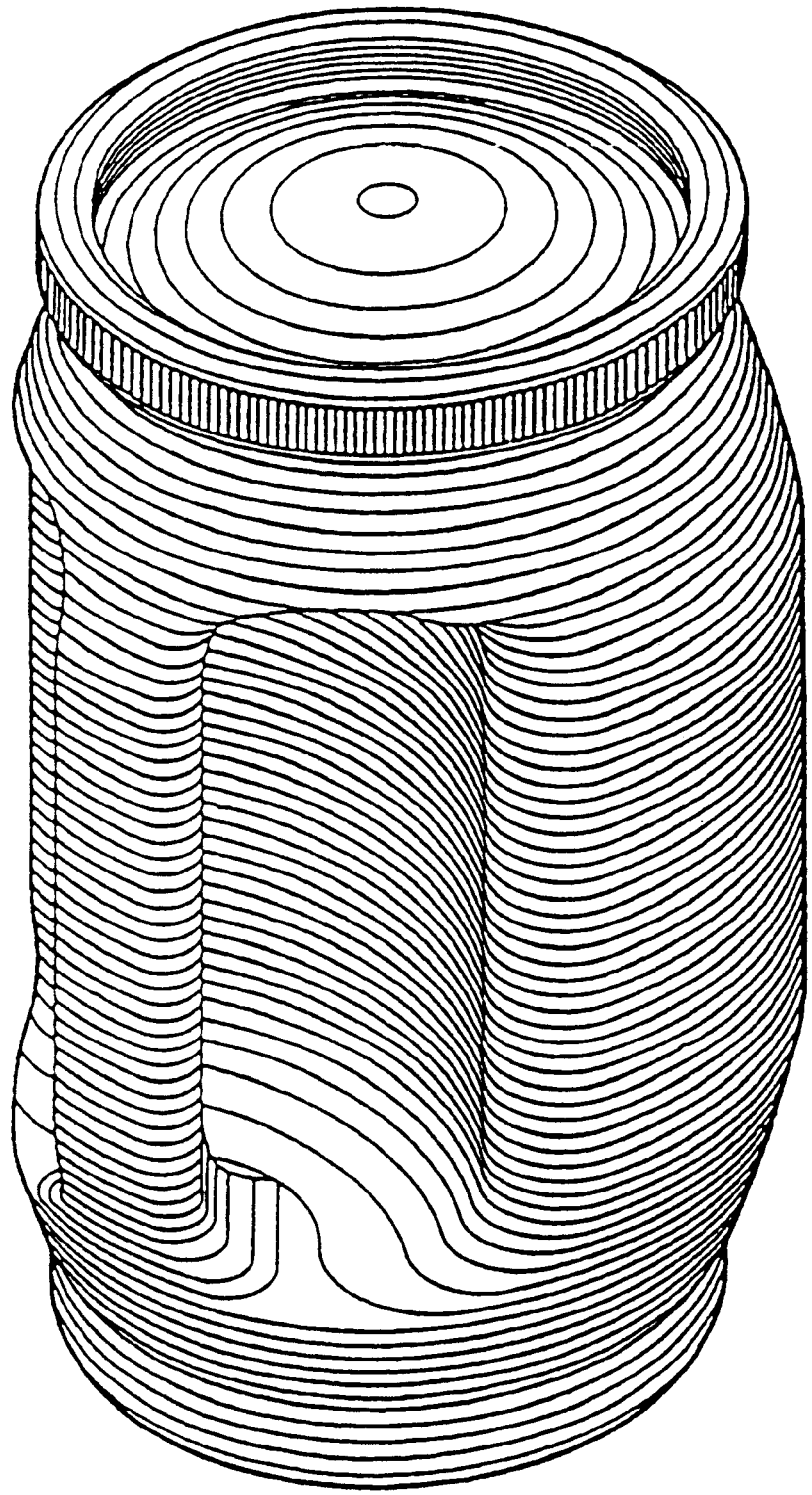
Fig. 1.1

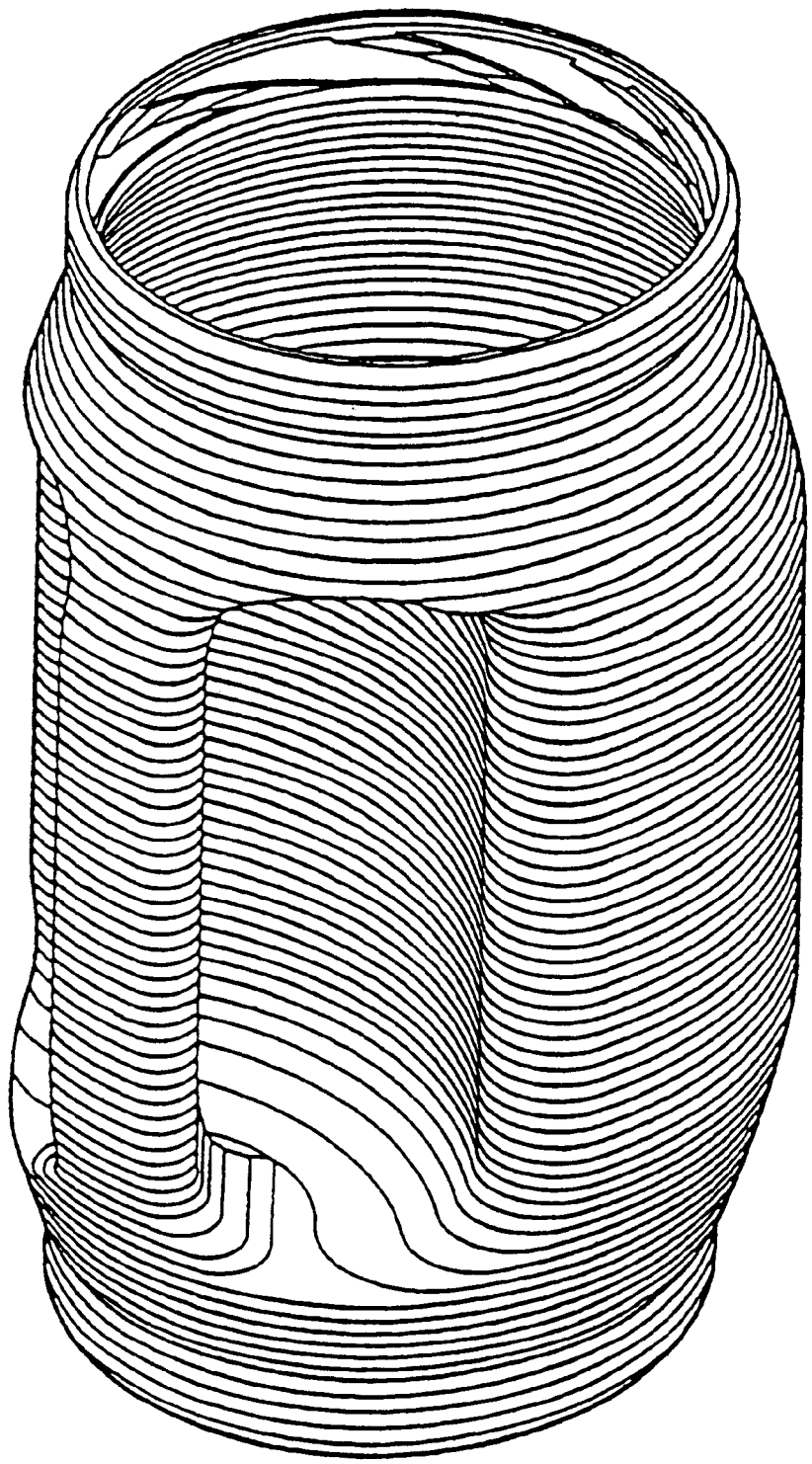
Fig. 1.2

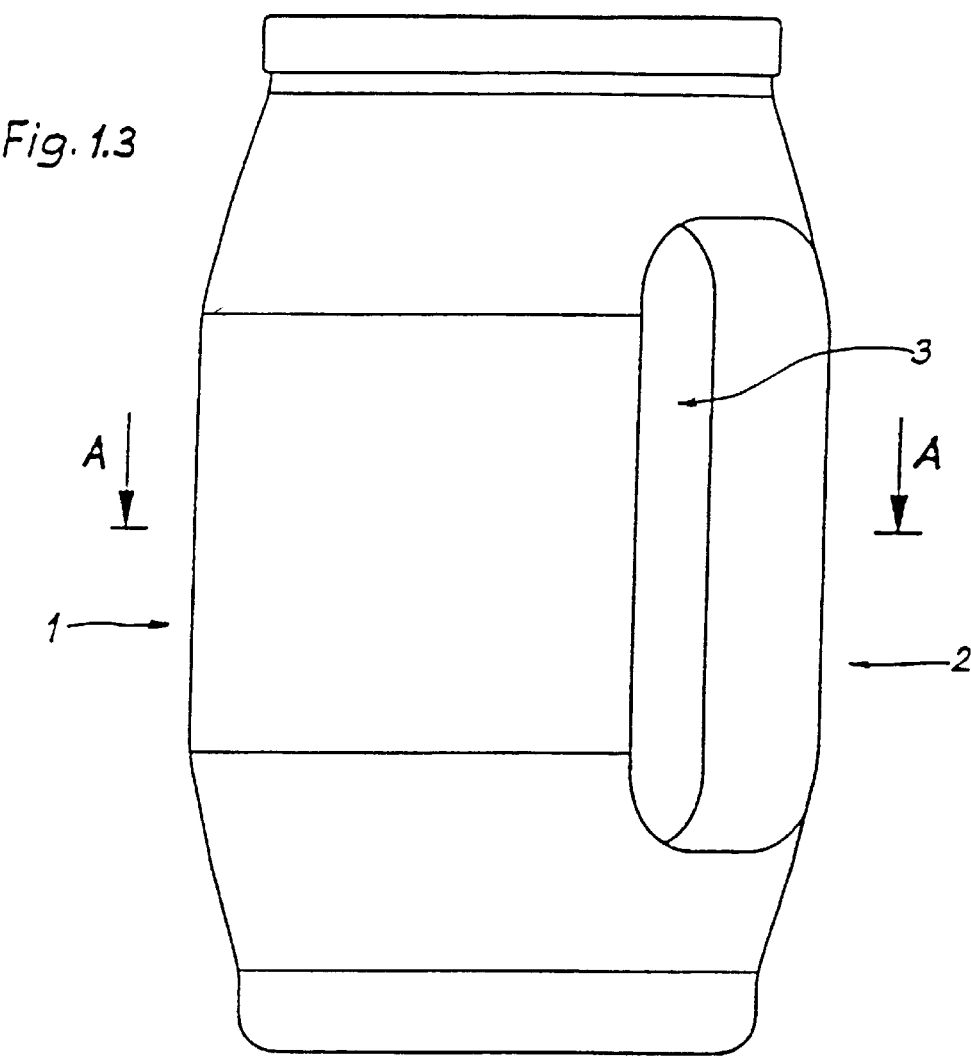
Fig. 1.3
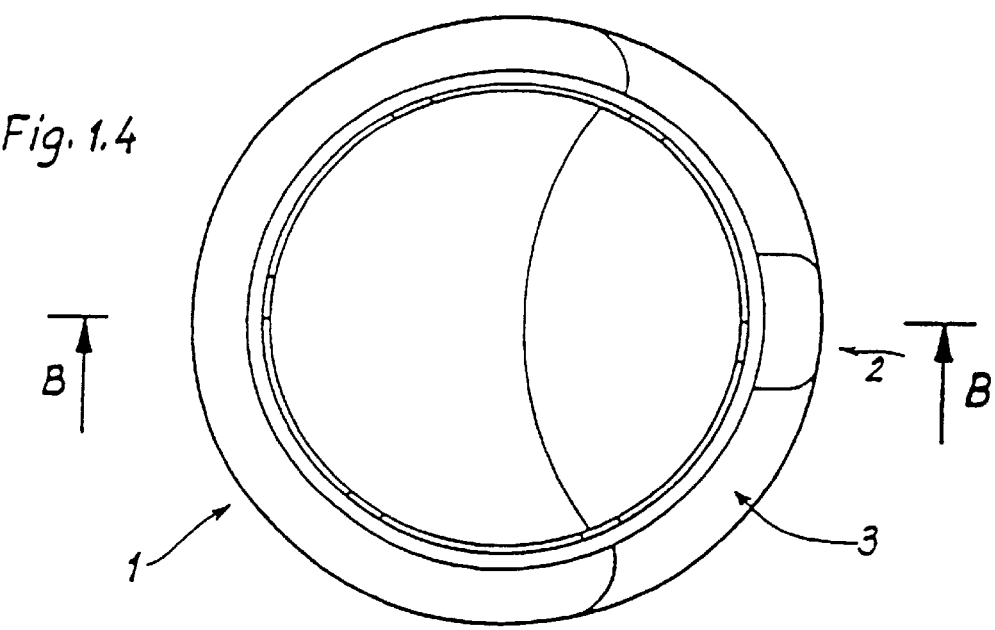
Fig. 1.4

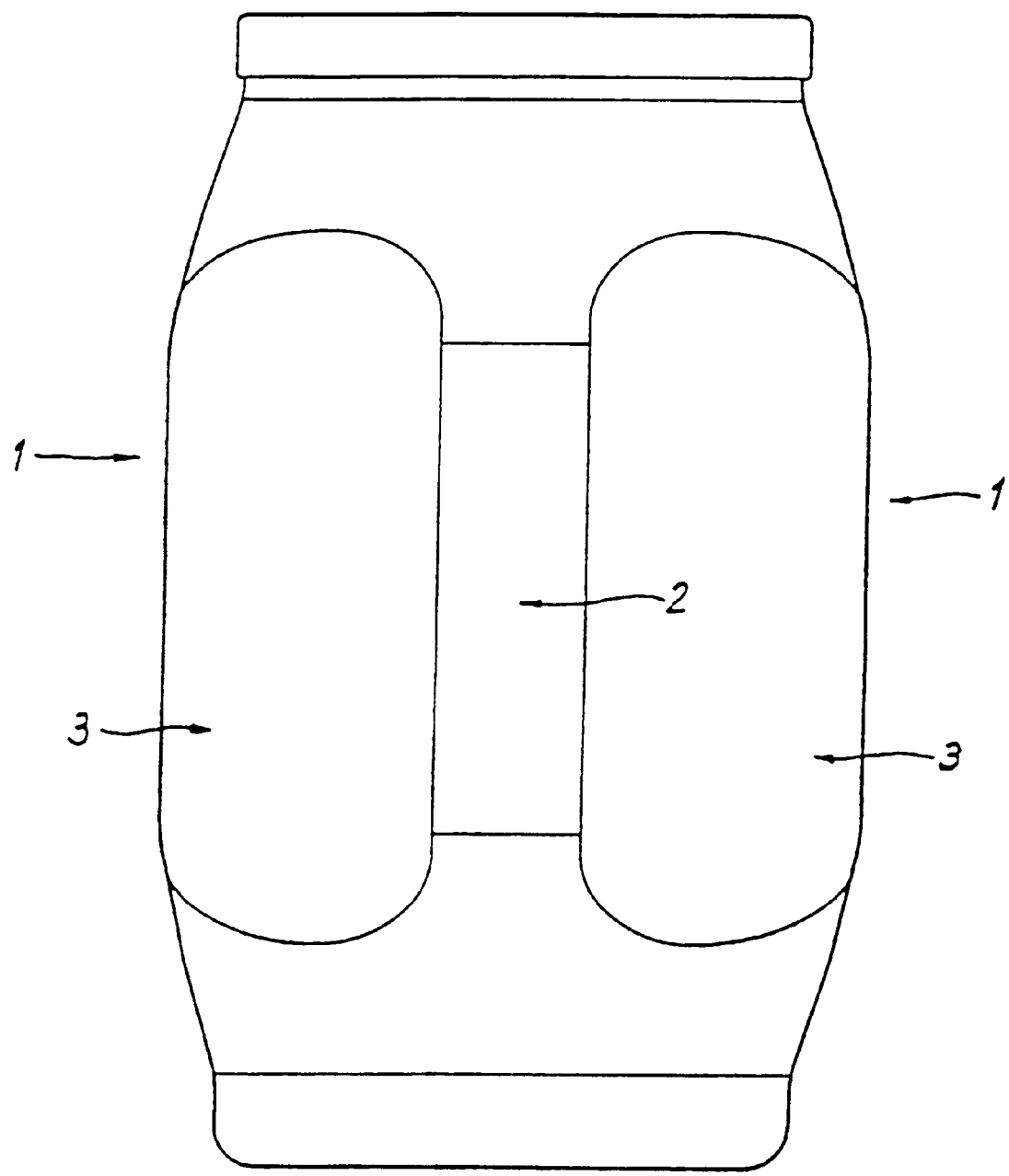
Fig. 1.5

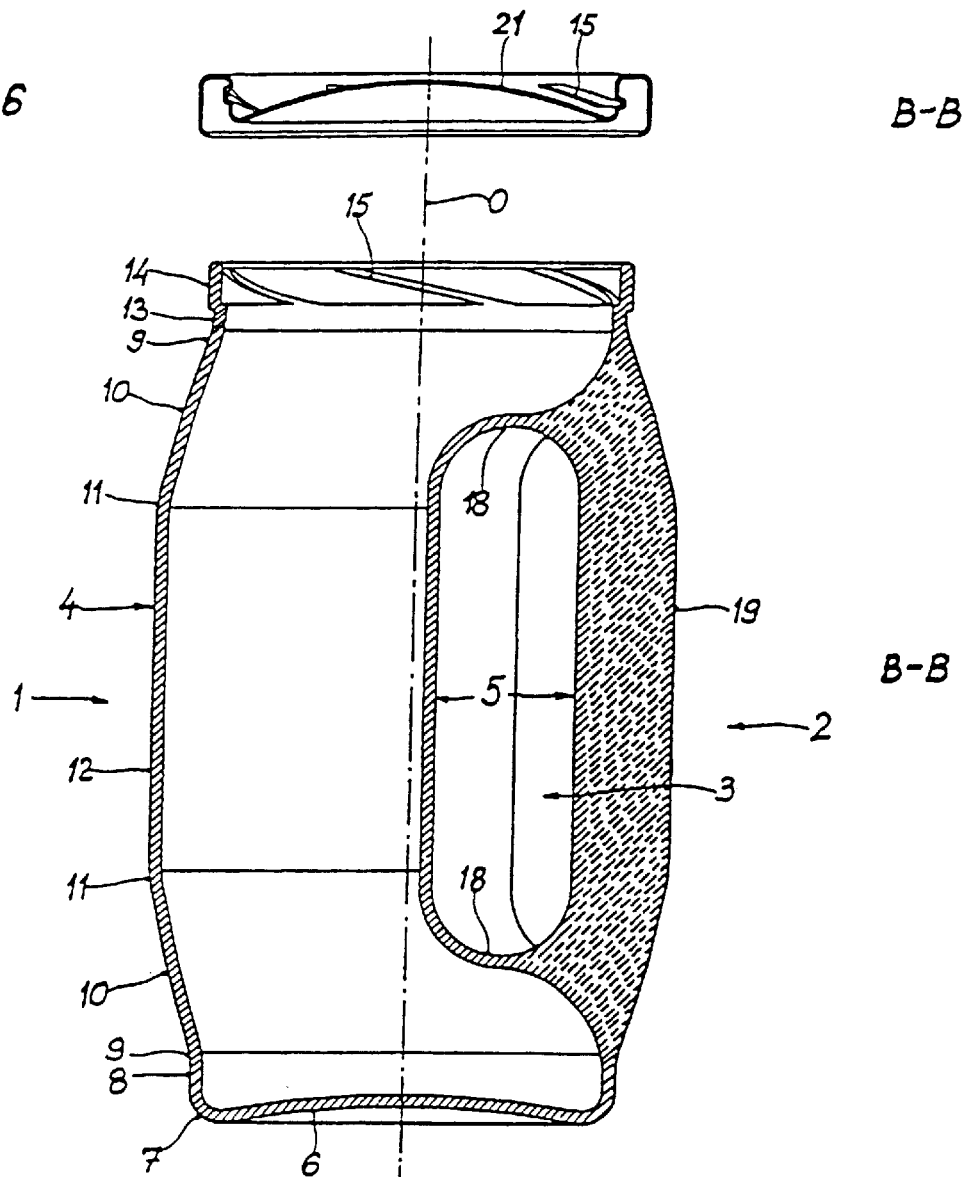

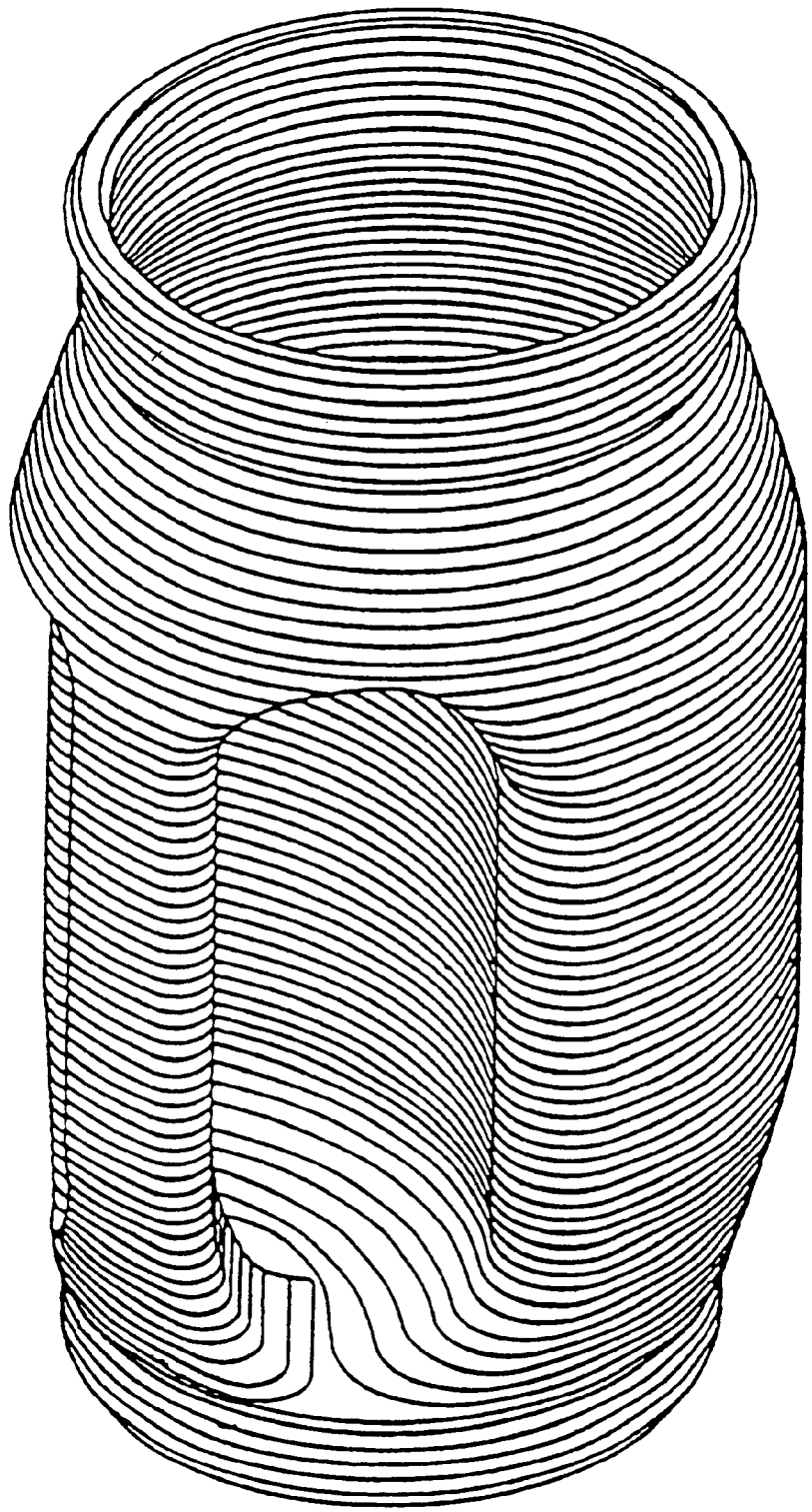
Fig. 2.1

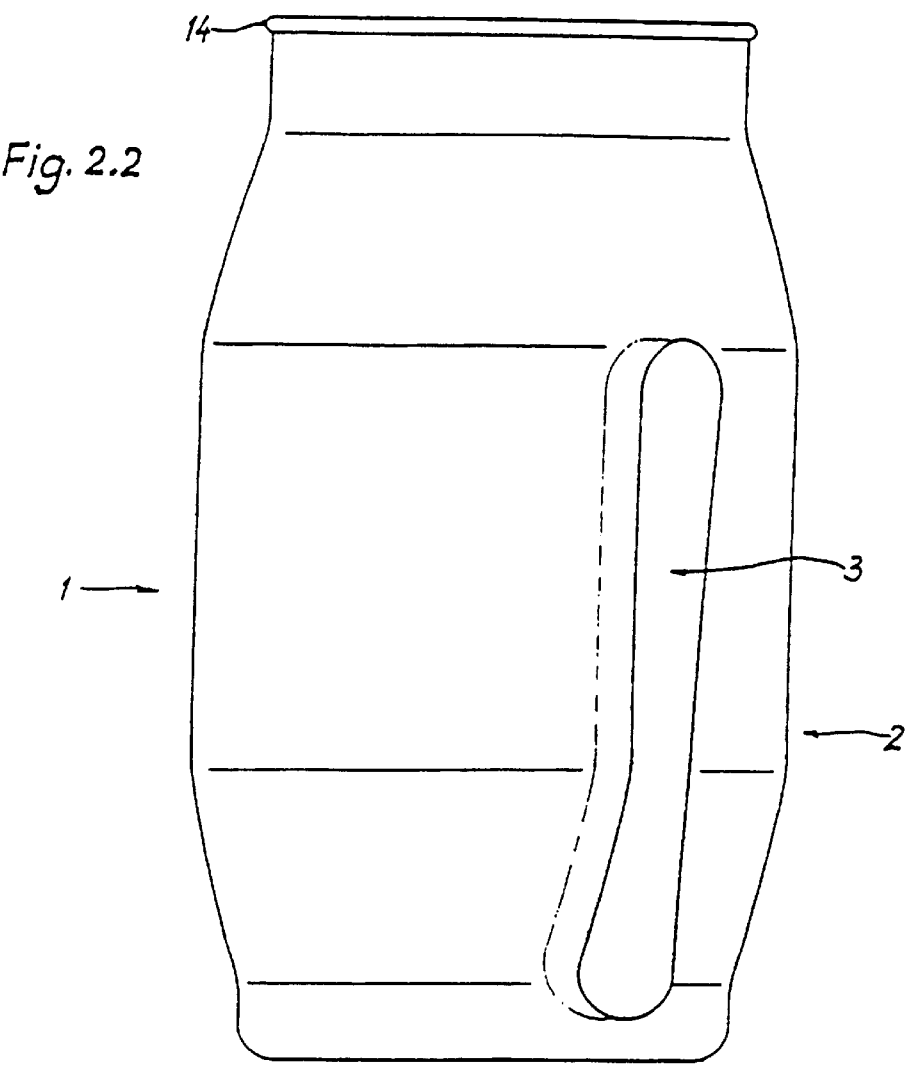
Fig. 2.2
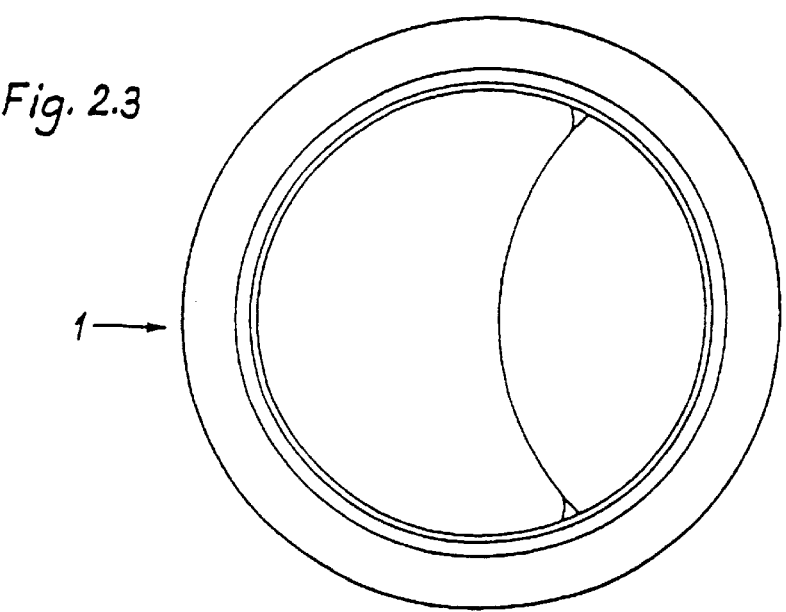
Fig. 2.3

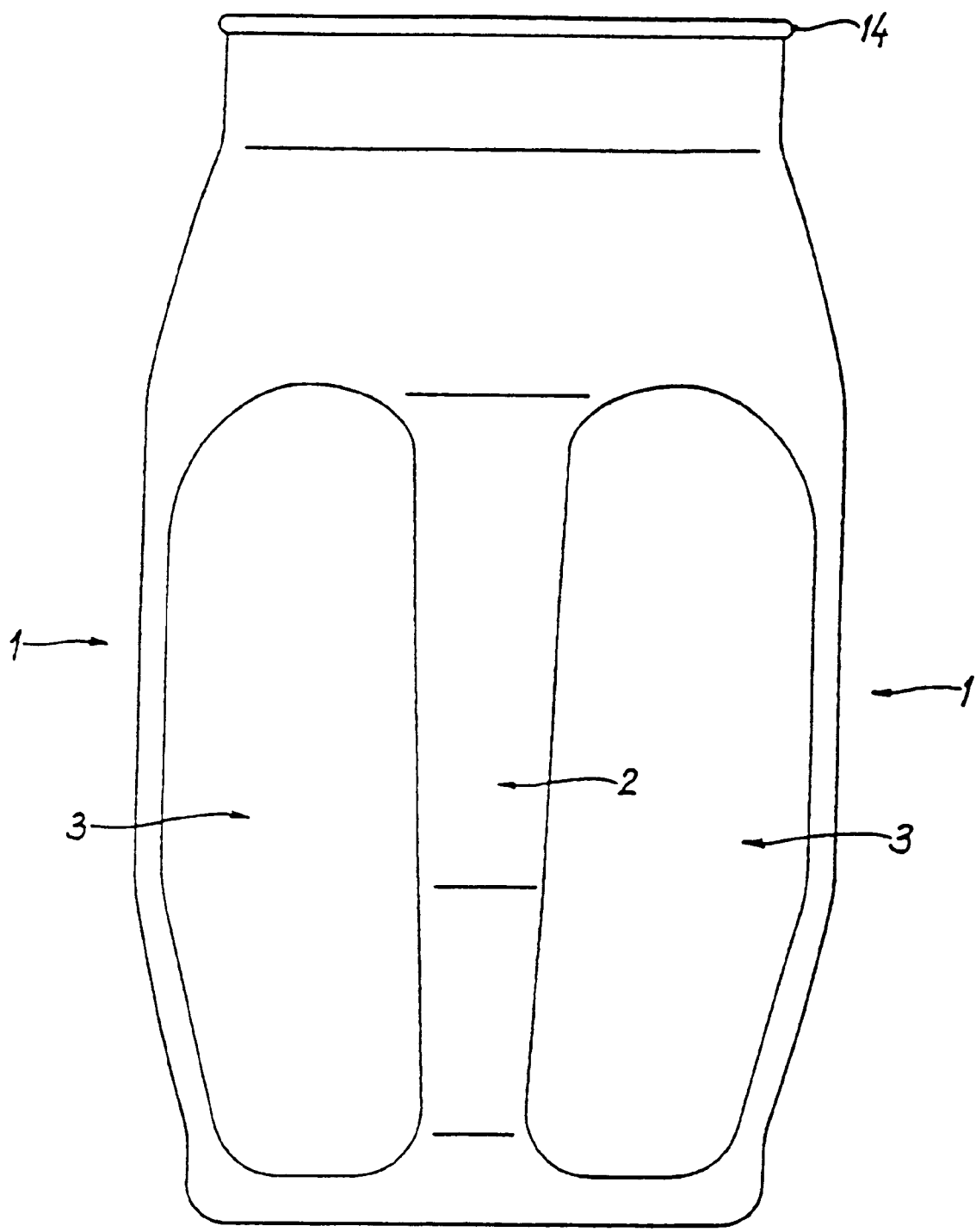
Fig. 2.4

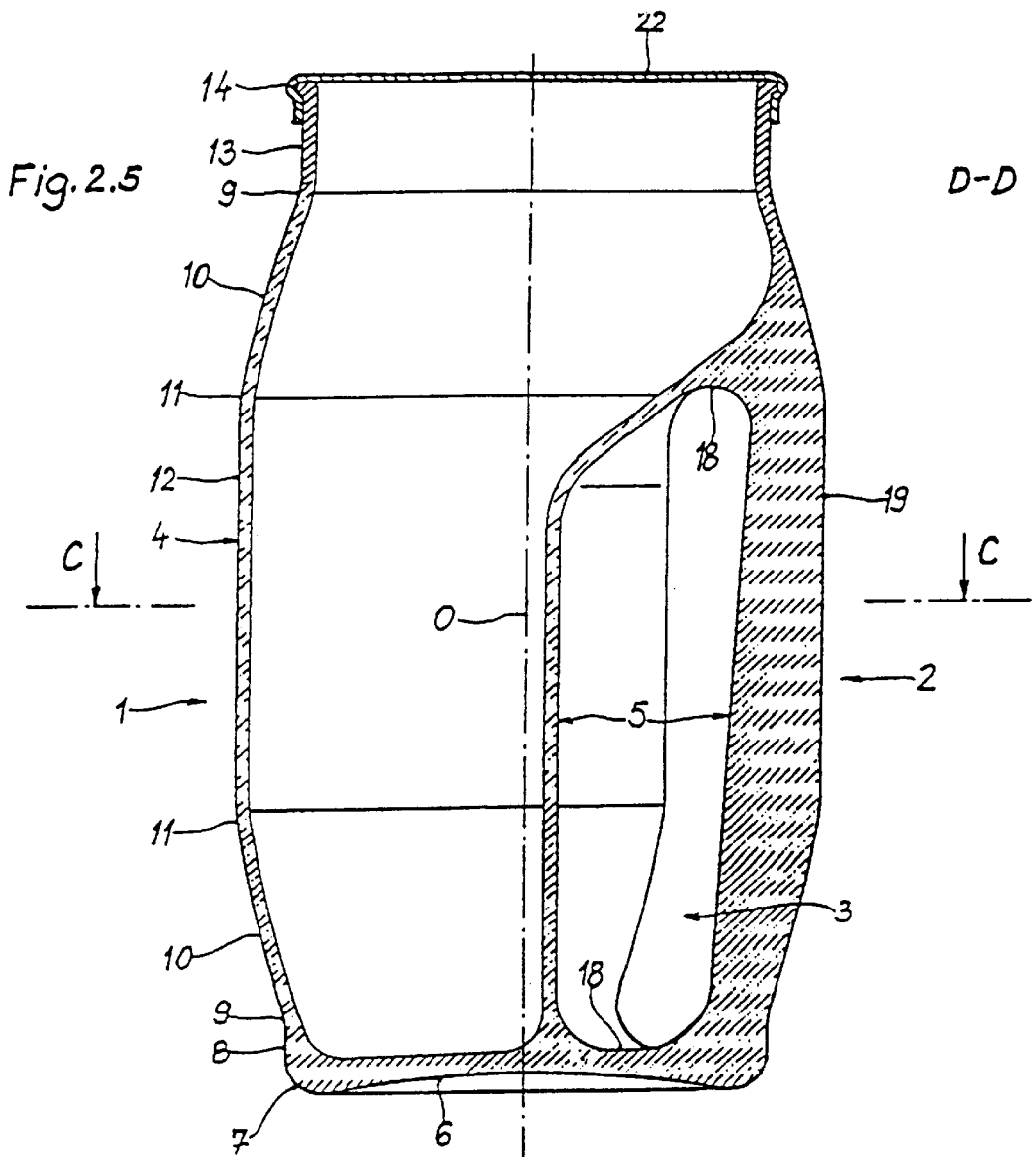
Fig. 2.5
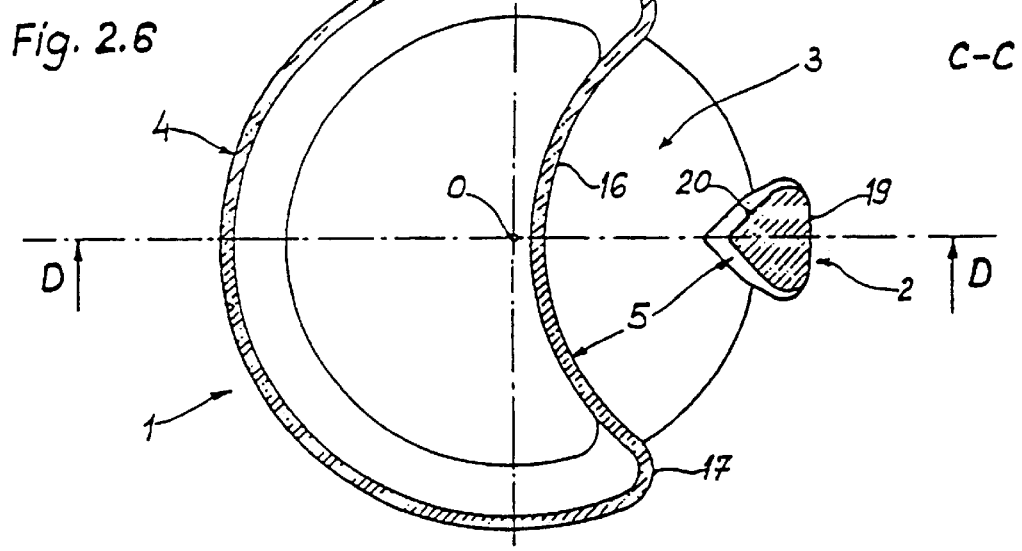
Fig. 2.6

CONTAINER WITH HANDLE FOR STORING AND CONSUMING LIQUIDS

TECHNICAL FIELD

The invention referred to is a container with handle whose special shape facilitates use as a receptacle for storage and transport of liquids with the possibility of drinking the contents directly from the container. In terms of shape and functional characteristics this container with handle belongs to the group of solid and semisolid storage containers made in one piece and drinking vessels as a part of tableware. As regards functional features and shape, this container with handle may equally serve as a bottle for storing liquids or a container from which to drink the stored liquid.

According to the International Patent Classification this invention can be grouped within the following technical fields:

B65D-001/02—Bottles or similar containers with necks or similar narrowed openings for pouring out the liquid;

A47G-019/22—Drinking vessels or saucers as part of tableware;

B65D-023/10—Handles of bottles or other glass containers.

BACKGROUND ART

Modern solid or semisolid storage containers like bottles predominantly serve for storage and transport of liquids. As the primary purpose of these containers is to store and transport liquids, the container mouth diameter is small in relation to the mean diameter of the cross-section of the container body. Containers of this kind sometimes feature handles or a part of the container body specifically designed to enable easier holding and handling of the container. Such packaging containers are not meant to be used for consuming their contents directly from the container whose mouth primarily serves for filling and pouring out liquids.

Contemporary drinking vessels such as glasses, jugs, mugs, tumblers, cups and the like are generally used as containers in which liquids are poured and then consumed by drinking. The mouth diameter of such vessels is therefore equal to or larger than the average diameter of the cross-section of the vessel body. Some vessels of this kind sometimes also feature handles or a part of the body specifically designed to enable easier hold and handling. These vessels primarily serve for consuming liquids through drinking, while storage and transport is their secondary purpose.

Storage and transport of liquids and their consumption, being activities which closely follow each other, brought about the development of two different types of product with exclusive function. There are only few examples of storage containers whose design makes them suitable also for drinking from. Such containers as a rule have a narrow area of application for a particular kind of liquid or paste-like foods. As storage containers they are disposable and as drinking vessels can only be used for a limited period of time. Being non-returnable, non-reusable storage containers, with extended life when used as a drinking vessels, they are usually made of low-cost materials and have poor formal and aesthetic qualities.

The invention of this specific kind of container with handle provides a solution to the technical problem of producing an attractive product that serves the double purpose of a low-cost, durable container for storage and transport of liquids, which is also returnable, and a practical, durable vessel for consuming the contents.

To be found on the market today are various designs of such two-purpose containers. Such articles are generally produced in series in very large quantities and are usually made of glass or polymeric materials, with their design allowing only a limited area of application. These are normally drinking vessels resembling glasses, jugs, mugs or cups in which a particular kind of food or drink is packaged. They serve as disposable storage containers with a short-term use as cheap drinking vessels.

Described in patent DE 4130320 is a polymeric drink container for cyclists that is fixed to the bicycle by being stuck up to the bicycle frame. The container body is designed in such a way as to enable easy fixing and picking up of the container from the bicycle frame by one hand. The container is filled through the opening after removing the lid and the content is consumed through a straw that comes out of the container lid. The said container has a very narrow field of application. It cannot be manufactured in very large series and is not suitable as a reusable product in the food beverages and brewing industry.

Described in patent U.S. Pat. No. 5,320,231 is a polymeric container intended for older people that is used both for storing drinks and as a drinking vessel. The container has a cylindrical body with an opening for handling the container and another opening through which drinks are filled and poured out. The container is provided with a screw cap. Owing to a relatively large opening, the liquid can be consumed directly from the container. Poor aesthetic qualities have, however, prevented wider application of this container as a reusable article widely used in the food and beverages industry.

DISCLOSURE OF THE INVENTION

The container according to this invention provides a solution to the technical problem of developing an attractive, simple and cost-efficient product that serves the multiple function of a container for storing, transporting and consuming drinks. The basic shape of the container is that of a small barrel in one piece with a handle, resembling drinking vessels for beer, wine fruit juices and other drinks. The container features a relatively large mouth with two possibilities of closing—with a disposable top without a screw or a reusable screw cap. The disposable top that is turned over the outer rim of the container mouth is opened by lifting or tearing up. The opening and closing of the container by means of a reusable cap is performed by screwing and unscrewing of the top from the threads that are wrought on the inside of the container mouth.

The barrel-like shape and the handle are the fundamental distinctive features of the container which facilitate its repeated application for a double purpose until the container breaks or is destroyed. The design of the container allows its application as a returnable, reusable bottle for storing and transporting liquids and as a vessel for drinking the original contents from. Thanks to the hygienic possibility of closing the container, it may be used as a mug, jug, or a glass from which the container content is drunk immediately after opening the cap. The inside of the container is easily cleaned owing to its relatively large opening, which makes it a practical and attractive article of tableware for use in the household and the catering industry.

FIGS. 1.1–1.8 show the design of the container with a centrally positioned handle and threads on the inner side of the container mouth that is closed by means of a reusable screw cap.

FIG. 1.1 shows the container with top in perspective with the marked lines of intersection of the visible outer parts of the container shell and top with horizontal planes placed at equal distances.

FIG. 1.2 shows the container without top in perspective, with the marked lines of intersection of the outer and inner visible part of the container shell with horizontal planes at equal distances.

FIG. 1.3 shows the side view of the container without top.

FIG. 1.4 shows the top view of the container without top.

FIG. 1.5 shows the plan view of the container without top.

FIG. 1.6 shows section B—B of the top from FIG. 1.4.

FIG. 1.7 shows section B—B of the container from FIG. 1.4.

FIG. 1.8 shows section A—A of the container from FIG. 1.3.

In FIGS. 2.1–2.6 show the design of the container with handle placed in the lower part of the container and a ring on the outer rim of the opening that is closed by means of a 105 disposable top that is turned over the ring on the outer rim of the opening. The top is lifted or torn to open.

FIG. 2.1 shows the container without top in perspective with the marked lines of intersection of the outer and inner visible part of the container shell with horizontal planes at equal distances.

FIG. 2.2 shows the side view of the container without top.

FIG. 2.3 shows the top view of the container without top.

FIG. 2.4 shows the plane view of the container without top.

FIG. 2.5 shows the section D—D of the container with top from FIG. 2.6.

FIG. 2.6 shows the section C—C of the container from FIG. 2.5.

Container 1 with a handle 2 is a barrel-shaped hollow body with wall of approximately uniform thickness, consisting of parts of regular geometric hollow bodies with a hollow 3 for grasping the handle 2. Both designs of the container with handle have the same basic form which is defined by the shape of the outer shell of the container 1 and the handle 2. The outer shell of the container 1 and the handle 2 composed of a section 4 that consists of an axis-symmetrical surface, consisting of shell segments having the shape of regular geometric solids and a section 5 consisting of a cylinder opening in container shell 4. Section 4 of the outer container shell consists of a circular concave surface 6 of the bottom of the container 1, which over a rounding 7 is fused into a shell 8 of a low upright circular cylinder the height of which is approximately seven times smaller than the diameter of its baseline. Over a slight rounding 9, the shell 8 of the low upright circular cylinder merges with a shell 10 of the bottom barrel-shaped surface that is formed through rotation of the large radius circular arc around the cental axis O. The diameter of the bottom baseline of the lower barrel-shaped surface is equal to the baseline diameter of the low, upright circular cylinder whose extension it represents, while the diameter of its upper baseline is larger than the diameter of its lower baseline by 20–30 percent The height of the bottom barrel-shaped surface is slightly smaller Man the radius of its bottom baseline. Over a slight rounding 11, the shell 10 of the bottom barrel-shaped surface is linked with a shell 12 of the upright circular cylinder whose baseline diameter is equal to the diameter of the upper baseline of the bottom barrel-shaped surface. The height of the upright circular cylinder is smaller than the diameter of its baseline by approximately 40%. Over the slight rounding 11, the shell 12 of the upright circular cylinder is followed by the shell 10 of the upper barrel-shaped surface that equals the shell 10 of the bottom barrel-shaped surface rotated at 180°. Merging with the shell 9 of the upper barrel-shaped surface over a gentle rounding 10 is a shell 13 of the low, upright circular cylinder whose baseline diameter is equal to the top baseline diameter of the upper barrel-shaped surface. The height of this low, upright circular cylinder is around four times smaller than the diameter of its baseline. Following the shell 13 is a ring 14 of the opening. In the container model with threads 15 wrought on the inner shell of the opening, the ring 14 is designed as a low, cylindrical ring the outer diameter of which is somewhat larger than the diameter of the baseline of the low, upright circular cylinder whose continuation it represents and the height smaller than one-tenth of its outer diameter. In container model without threads, the ring 14 has the form of a semicircular ring of small diameter at the outer rim of the opening.

The hollow 3 in the outer shell 4 described above is formed by penetration of the cylinder in the shell 4, whereby a section 5 of the outer shell is created. It is located within the rotational surface that is formed by its generatix. The section 5 of the outer shell consists of a section 16 that is formed by penetration in one half of the shell 4 of the cylinder whose central axis is parallel to central axis O. The diameter of the cylinder making the penetration is slightly larger than the diameter of the circle around the fist of an adult person with fingers half-bent, while its height is approximately equal to the width of the palm of a grown-up person. At the sides, the section 16 is connected with the shell 4 through sections of a shell 17 that belong to cylindrical surfaces of small radius, while at the bottom and top sections it is linked with the handle 2 through sections of a shell 18, belonging to ring surfaces whose circle diameter is approximately equal to the thickness of an adult person's palm.

Handle 2 is a solid vertical support that is embodied in the outline of outer the shell 4. In cross-section the handle 2 has a triangular profile. The generatrix of the shell 4 forms an outer surface 19 of the. handle. 2, with two flat surfaces 20 that form a right angle forming its inner surfaces. The tops of the triangular section of the handle 2 are rounded. The handle 2 forms one body with the container 1, since it is made by casting or pressing using the same tool.

Position of the handle 2 in relation to the container 1 defines the overall outer appearance of the container.

FIGS. 1.1–1.8 show the container design with handle placed in the central part of the container 1, with handle ends placed at an equal distance from the container bottom i.e. opening. Both ends of the handle 2 are connected to the shell 3 of the container 1.

Shown in FIGS. 2.1–2.6 is the container design with handle placed in the central and lower section of the container 1. In this design the upper end of the handle 2 is linked to the shell 4 of the container 1, with lower end attached to the bottom of the container 1.

The hollow 3 between the container 1 and the handle 2 is the space in which an adult person may place its fist with four fingers gathered and half-bent so as to grasp the handle 2. When the inner tip of the triangle-shaped handle 2 positions itself in one of the joints in a finger that is closed in a fist, the handle can be grasped with the clenched fingers and thumb so that the container 1 with handle 2 cannot rotate around the axis of the handle in the closed fist. The rounded edges of the hollow 3 and the position of the handle 2 with respect to the centre of gravity of the filled container ensure comfortable and safe handling of the container with handle whether it is used as a container for packaging or as a drinking vessel.

The container 1 is closed by means of a reusable screw cap or by means of a disposable top that is turned over the ring at the outer edge of the container opening.

Depicted in FIG. 1.6 is a cap 21 with threads 15, while in FIG. 1.7 the container 1 with threads 15 wrought on the inner shell of the container opening that is closed by means of a cap 21 is to be seen. The threads 15 at the cap 21 and the container 1 are designed as multiple threads in order to enable safer closure and ensure a small angle of turning of the cap 20. Screw connection with threads 15 on the inner shell of the opening of the container 1 enables drinking of the container content without the discomfort of lips coming into contact with the threads 15. Thanks to this special system of closing, the container with handle may be used both as a reusable, returnable storage container and as a durable and practical drinking vessel.

FIG. 2.5 shows the design of a container 1 with a ring 14 at the outer rim of the opening closed by means of a disposable top 22 that is turned over the ring 14. This type of top is opened by lifting the top 22 over the ring 14 or by tearing the edge of the top 22. The opening of the container 1 with the semicircular ring 14 also enables comfortable drinking of the contents of the container 1, making it a practical, reusable drinking vessel. Apart from this, a special system of closing facilitates its use as a reusable, returnable storage container.

Both methods of closing can be applied in containers with handle positioned only in the central part of the container as well as in containers that are provided with a handle in the central and lower part of the container.

The dimensions of the handle 2 and the hollow 3 are defined by the size of an adult person's fist. The useful volume of the container 1 may vary. The optimum useful volume is 0.33 l up to 1 l. In order to make drinking possible from the container, the diameter of the container opening has to be several times larger than standard diameter of bottle opening, but smaller than the largest diameter of the cylindrical section of the container 1. The above described designs of container with handle may find application in food and beverages industry as reusable, returnable containers for storage and transport of liquid and semi-liquid products such as wine, beer, fruit juices, mineral water, various food items made of fruit, vegetables, cereals and other foodstuffs.

In addition, the above described designs of container with handle may find application in the catering industry and in the household where they may serve as mugs, jugs or glasses. This type of drinking vessel enables drinking of industrially bottled beverages immediately on opening the top. Given their ergonomic, practical and attractive shape, these containers may also be used as durable tableware items for drinking alcoholic and non-alcoholic beverages.

What is claimed is:

1. Container with handle for storing and drinking beverages, consisting of a hollow, axisymmetrical container (1) of uniform wall thickness with a handle (2), characterized by the fact, that the shape of the container (1) is defined by the shape of its outer shell consisting of a section (4) of the outer shell, which is formed by an axisymmetrical surface consisting of a cylindrical bottom (6,7,8), a barrel-shaped part (9, 10, 11, 12), a cylindrical neck (13), and a cylindrical ring (14) of the opening for filling and emptying the container (1), and a section (5) of the outer shell, which is formed by a part of a cylindrical shell (16) which is formed through penetration of a cylinder, the central axis of which is parallel to the central axis (O) of the container (1), into one half of the shell (4) to which it is connected through sections of small-radius cylindrical shells (17), that the container (1) has a handle (2) having the form of a solid support with a triangular cross-section with rounded tops an outer surface (19) which is produced by the generatrix of a shell (4), with two interior flat surfaces (20) and two annular interior surfaces (18) produced by a hollow (3) that is created through penetration of a cylinder, the central axis of which is parallel to the central axis (O) of the container (1), into one half of the shell (4), and that the inner diameter of the opening for filling and emptying of the container contents is larger than 5.0 cm, that the largest outer diameter of the barrel-shaped section is 1.2–2.0 times larger than the inner diameter of the opening, and that the container height is 2.0–3.0 times larger than the inner diameter of the opening.

2. Container with handle for storing and drinking beverages, according to claim 1, characterized by the fact, that the hollow (3) is placed in the central part of the container (1) so that top and bottom surfaces (18) of the hollow (3) are placed at an equal distance from the bottom i.e. the opening of the container (1).

3. Container with handle for storing and drinking beverages, according to claim 1, characterized by the fact, that the hollow (3) is placed in the central and lower part of the container (1) so that the top surface (18) of the hollow (3) is connected to the shell (4) of the container (1), with the bottom surface (18) of the hollow (3) attached to the bottom of the container (1).

4. Container with handle for storing and consuming drinks, according to claim 1, characterized by, the fact that the opening of Container is closed and opened by means of Cap with steep multiple Threads that engage with steep multiple Threads on the inner side of the opening of Container.

5. Container with handle for storing and consuming drinks, according to claim 1, characterized by, the fact that the opening of Container is closed by means of Top that is turned over Ring and is opened by lifting Top over Ring or by tearing the edge of Top.

6. Container with handle for storing and consuming drinks, according to claim 1, characterized by, the fact that the diameter of the opening of Container is several times larger than standard diameter of bottle openings and smaller than the largest diameter of the cylindrical part of Container, and that the useful volume of Container ranges from 0.3 litre to 1.5 litre.

7. Container with handle for storing and consuming drinks, according to claim 1, characterized by, the fact that it is used in the food and beverages industry as a reusable, returnable container for storing and transporting liquid and semi-liquid products, as well as in the catering industry and households where it serves as a drinking vessel for alcoholic and non-alcoholic beverages.

8. Container with handle for storing and consuming drinks, according to claim 1, characterized by, the fact that it is made of polymeric materials, metals, their alloys, glass, ceramics or wood.

* * * * *